(12) United States Patent
Sheinman

(10) Patent No.: US 10,994,333 B2
(45) Date of Patent: May 4, 2021

(54) METHOD AND APPARATUS FOR 3D PRINTING BY SELECTIVE SINTERING

(71) Applicant: Stratasys Ltd., Rehovot (IL)

(72) Inventor: Yehoshua Sheinman, RaAnana (IL)

(73) Assignee: Stratasys Ltd., Rehovot (IL)

( * ) Notice: Subject to any disclaimer, the term of this patent is extended or adjusted under 35 U.S.C. 154(b) by 517 days.

(21) Appl. No.: 15/304,873

(22) PCT Filed: May 7, 2015

(86) PCT No.: PCT/IL2015/050478
§ 371 (c)(1),
(2) Date: Oct. 18, 2016

(87) PCT Pub. No.: WO2015/170330
PCT Pub. Date: Nov. 12, 2015

(65) Prior Publication Data
US 2017/0173696 A1    Jun. 22, 2017

Related U.S. Application Data

(60) Provisional application No. 61/990,165, filed on May 8, 2014.

(51) Int. Cl.
*B22F 3/16* (2006.01)
*B22F 3/18* (2006.01)
(Continued)

(52) U.S. Cl.
CPC ............. *B22F 3/16* (2013.01); *B22F 3/003* (2013.01); *B22F 3/1017* (2013.01); *B22F 3/18* (2013.01);
(Continued)

(58) Field of Classification Search
CPC ............................................. B29K 2105/0047
See application file for complete search history.

(56) References Cited

U.S. PATENT DOCUMENTS 4,247,508 A    1/1981  Housholder
4,806,985 A *  2/1989  Foley ................. G03G 15/6532
                                                          271/311
(Continued)

FOREIGN PATENT DOCUMENTS

CN    1496769      11/1999
CN    100336655     9/2007
(Continued)

OTHER PUBLICATIONS

International Search Report and the Written Opinion dated Jun. 26, 2018 From the International Searching Authority Re. Application No. PCT/IL2018/050317. (17 Pages).
(Continued)

*Primary Examiner* — Alexandra M Moore
*Assistant Examiner* — Catherine P Smith

(57) ABSTRACT

A system (100) for building a three dimensional object includes a powder delivery station (10) for applying a layer of powder material on a building tray (200), a digital printing station (30) for printing a mask pattern on the layer, a sintering station (50) for selectively sintering the portion of the layer that is defined by the mask to be sintered and a stage (250) for repeatedly advancing the building tray (200) to each of the powder delivery station, digital printing station and sintering station to build a plurality of layers that together form the three dimensional object. The mask pattern defines a negative portion of the layer to be sintered. Optionally, the system includes a die compaction station (40) for compacting per layer of powder material.

18 Claims, 9 Drawing Sheets

(51) Int. Cl.
| | |
|---|---|
| *B33Y 30/00* | (2015.01) |
| *B22F 3/00* | (2021.01) |
| *B29C 64/153* | (2017.01) |
| *B33Y 10/00* | (2015.01) |
| *B33Y 40/00* | (2020.01) |
| *B22F 3/10* | (2006.01) |
| *B22F 3/17* | (2006.01) |
| *B22F 10/10* | (2021.01) |

(52) U.S. Cl.
CPC ............ *B22F 10/10* (2021.01); *B29C 64/153* (2017.08); *B33Y 10/00* (2014.12); *B33Y 30/00* (2014.12); *B33Y 40/00* (2014.12); *B22F 2003/175* (2013.01); *B22F 2998/10* (2013.01)

(56) References Cited

U.S. PATENT DOCUMENTS

| | | | |
|---|---|---|---|
| 5,076,869 A | 12/1991 | Bourell et al. | |
| 5,139,338 A | 8/1992 | Pomerantz et al. | |
| 5,154,881 A | 10/1992 | Rutz et al. | |
| 5,204,055 A | 4/1993 | Sachs et al. | |
| 5,263,130 A | 11/1993 | Pomerantz et al. | |
| 5,287,435 A | 2/1994 | Cohen et al. | |
| 5,354,414 A * | 10/1994 | Feygin | B22C 9/00 156/245 |
| 5,387,380 A | 2/1995 | Cima et al. | |
| 5,519,816 A | 5/1996 | Pomerantz et al. | |
| 5,555,481 A | 9/1996 | Rock et al. | |
| 5,637,175 A | 6/1997 | Feygin et al. | |
| 5,649,277 A * | 7/1997 | Greul | B22F 3/20 419/2 |
| 5,695,708 A | 12/1997 | Karp et al. | |
| 5,744,433 A | 4/1998 | Storstrom et al. | |
| 5,902,537 A | 5/1999 | Almquist et al. | |
| 6,036,777 A | 3/2000 | Sachs | |
| 6,147,138 A | 11/2000 | Hochsmann | |
| 6,193,923 B1 * | 2/2001 | Leyden | B29C 41/12 264/308 |
| 6,589,471 B1 * | 7/2003 | Khoshnevis | B33Y 10/00 264/497 |
| 7,141,207 B2 | 11/2006 | Jandeska, Jr. et al. | |
| 7,148,840 B2 | 12/2006 | Dooi | |
| 7,460,984 B1 | 12/2008 | Clark et al. | |
| 7,896,639 B2 | 3/2011 | Kritchman et al. | |
| 8,119,053 B1 | 2/2012 | Bedal et al. | |
| 8,682,395 B2 | 3/2014 | Muhammad | |
| 8,810,537 B2 | 8/2014 | Yousefpor et al. | |
| 8,907,929 B2 | 12/2014 | Li et al. | |
| 9,573,323 B2 | 2/2017 | Heide | |
| 10,730,109 B2 | 8/2020 | Sheinman et al. | |
| 2003/0063138 A1 | 4/2003 | Varnon et al. | |
| 2004/0018107 A1 | 1/2004 | Khoshnevis | |
| 2004/0146650 A1 | 7/2004 | Lockard et al. | |
| 2004/0224173 A1 * | 11/2004 | Boyd | C08J 5/18 428/500 |
| 2006/0246222 A1 * | 11/2006 | Winkler | B29C 43/006 427/355 |
| 2007/0241482 A1 * | 10/2007 | Giller | B29C 64/165 264/494 |
| 2008/0111271 A1 | 5/2008 | Khoshnevis | |
| 2009/0255912 A1 | 10/2009 | Dietrich | |
| 2010/0321325 A1 | 12/2010 | Springer et al. | |
| 2011/0241947 A1 * | 10/2011 | Scott | B29C 64/153 343/700 MS |
| 2013/0186514 A1 | 7/2013 | Zhuang et al. | |
| 2013/0186558 A1 * | 7/2013 | Comb | G03G 15/169 156/277 |
| 2013/0241113 A1 * | 9/2013 | Geers | B29C 64/205 264/401 |
| 2014/0110872 A1 | 4/2014 | Levy et al. | |
| 2014/0134962 A1 | 5/2014 | Huynh et al. | |
| 2014/0170012 A1 * | 6/2014 | Delisle | B22F 3/1055 419/6 |
| 2015/0273769 A1 | 10/2015 | Korn | |
| 2015/0301651 A1 | 10/2015 | Leigh et al. | |
| 2015/0324029 A1 | 11/2015 | Bakken et al. | |
| 2016/0107383 A1 | 4/2016 | Dikovsky et al. | |
| 2016/0114427 A1 * | 4/2016 | Eibl | B22F 3/1055 419/7 |
| 2016/0195943 A1 | 7/2016 | Gur et al. | |
| 2017/0072636 A1 | 3/2017 | Ng et al. | |
| 2017/0176979 A1 | 6/2017 | Lalish et al. | |
| 2017/0239719 A1 | 8/2017 | Buller et al. | |
| 2017/0240472 A1 | 8/2017 | Blacker et al. | |
| 2017/0305067 A1 | 10/2017 | Cortes et al. | |
| 2018/0103728 A1 * | 4/2018 | Koo | B41M 3/00 |
| 2018/0104793 A1 | 4/2018 | Franke et al. | |
| 2018/0297284 A1 | 10/2018 | Fulop et al. | |
| 2019/0134705 A1 | 5/2019 | Sheinman et al. | |
| 2019/0232367 A1 | 8/2019 | Sheinman et al. | |
| 2020/0001665 A1 | 1/2020 | Sheinman et al. | |
| 2020/0070246 A1 | 3/2020 | Sheinman et al. | |

FOREIGN PATENT DOCUMENTS

| | | | |
|---|---|---|---|
| CN | 100406169 | 7/2008 | |
| CN | 203109234 | 8/2013 | |
| CN | 103842157 | 6/2014 | |
| CN | 104536625 | 4/2015 | |
| CN | 104968500 | 10/2015 | |
| DE | 10344901 | 5/2004 | |
| DE | 102009029765 | 12/2010 | |
| DE | 102013011676 A1 * | 1/2015 | ............ B22F 3/1055 |
| EP | 0250121 | 12/1987 | |
| EP | 2728449 | 5/2014 | |
| EP | 2747193 | 6/2014 | |
| JP | 2015-196265 | 11/2015 | |
| TW | 201331026 | 8/2013 | |
| WO | WO 98/28124 | 7/1998 | |
| WO | WO 2004/009281 | 1/2004 | |
| WO | WO2004/058487 | 7/2004 | |
| WO | WO 2013/021173 | 2/2013 | |
| WO | WO 2014/068579 | 5/2014 | |
| WO | WO 2015/170330 | 11/2015 | |
| WO | WO 2016/176432 | 11/2016 | |
| WO | WO 2017/179052 | 10/2017 | |
| WO | WO 2017/179052 A8 | 10/2017 | |
| WO | WO 2018/118009 | 6/2018 | |
| WO | WO 2018/173048 | 9/2018 | |
| WO | WO 2018/173050 | 9/2018 | |
| WO | WO 2020/129054 | 6/2020 | |

OTHER PUBLICATIONS

International Search Report and the Written Opinion dated Jun. 26, 2018 From the International Searching Authority Re. Application No. PCT/IL2018/050319. (18 Pages).
Notification of Office Action and Search Report dated Sep. 3, 2018 From the State Intellectual Property Office of the People's Republic of China Re. Application No. 201580037461.9. (5 Pages).
International Search Report and the Written Opinion dated Jul. 21, 2017 From the International Searching Authority Re. Application No. PCT/IL2017/050439. (21 Pages).
Lai et al. "ExtendThumb: A Target Acquisition Approach for One-Handed Interaction With Touch-Screen Mobile Phones", IEEE Transactions on Human-Machine Systems, 45(3): 362-370, Dec. 18, 2014. Abstract.
International Preliminary Report on Patentability dated Jun. 1, 2016 From the International Preliminary Examining Authority Re. Application No. PCT/IL2015/050478.
International Search Report and the Written Opinion dated Aug. 13, 2015 From the International Searching Authority Re. Application No. PCT/IL2015/050478.
International Preliminary Report on Patentability dated Oct. 25, 2018 From the International Bureau of WIPO Re. Application No. PCT/IL2017/050439. (16 Pages).
Supplementary European Search Report and the European Search Opinion dated Jan. 2, 2018 From the European Patent Office Re. Application No. 15789324.9. (7 Pages).

(56) References Cited

OTHER PUBLICATIONS

Notification of Office Action dated Jan. 22, 2018 From the State Intellectual Property Office of the People's Republic of China Re. Application No. 201580037461.9 and its Translation into English.(7 Pages).
European Search Report and the European Search Opinion dated Jul. 4, 2019 From the European Patent Office Re. Application No. 19172027.5. (16 Pages).
Communication Pursuant to Article 94(3) EPC dated Jun. 5, 2019 From the European Patent Office Re. Application No. 17723527.2. (7 Pages).
Restriction Official Action dated Aug. 15, 2019 From the US Patent and Trademark Office Re. U.S. Appl. No. 16/092,770. (10 pages).
International Preliminary Report on Patentability dated Oct. 3, 2019 From the International Bureau of WIPO Re. Application No. PCT/IL2018/050317. (12 Pages).
International Preliminary Report on Patentability dated Oct. 3, 2019 From the International Bureau of WIPO Re. Application No. PCT/IL2018/050319. (12 Pages).
Official Action dated Oct. 11, 2019 From the US Patent and Trademark Office Re. U.S. Appl. No. 16/092,770. (39 Pages).
Corrected Written Opinion dated May 25, 2020 From the International Searching Authority Re. Application No. PCT/IL2019/051374. (5 Pages).
Official Action dated Jan. 2, 2020 From the US Patent and Trademark Office Re. U.S. Appl. No. 16/092,770. (30 pages).
Advisory Action dated Apr. 1, 2020 from the US Patent and Trademark Office Re. U.S. Appl. No. 16/092,770. (2 pages).
International Search Report and the Written Opinion dated Mar. 19, 2020 From the International Searching Authority Re. Application No. PCT/IL2019/051374. (14 Pages).
Office Action dated Mar. 24, 2020 From the Israel Patent Office Re. Application No. 248806 and its Translation Into English. (4 Pages).
Schulz et al. "Polyhedral Surface Approximation of Non-Convex Voxel Sets Through the Modification of Convex Hulls", Proceedings of the 12th International Workshop on Combinatorial Image Analysis, IWCIA '08, XP019087154, p. 38-50, Apr. 7, 2008.
Zwier et al. "Design for Additive Manufacturing: Automated Build Orientation Selection and Optimization", 5th CIRP Global Web Conference Research and Innovation for Future Production, Procedia CIRP, XP055373404, 55: 128-133, Jan. 2016.
Communication Pursuant to Article 94(3) EPC dated Apr. 28, 2020 From the European Patent Office Re. Application No. 19172027.5. (7 Pages).
Official Action dated May 11, 2020 from the US Patent and Trademark Office Re. U.S. Appl. No. 16/381,042. (31 pages).
Notification of Office Action and Search Report dated Jun. 1, 2020 From the State Intellectual Property Office of the People's Republic of China Re. Application No. 201780031178.4. (13 Pages).
Translation Dated Jun. 9, 2020 of Notification of Office Action dated Jun. 1, 2020 From the State Intellectual Property Office of the People's Republic of China Re. Application No. 201780031178.4. (8 Pages).
Restriction Official Action dated Jan. 30, 2020 From the US Patent and Trademark Office Re. U.S. Appl. No. 16/381,042. (7 pages).
Final Official Action dated Sep. 25, 2020 from the US Patent and Trademark Office Re. U.S. Appl. No. 16/381,042. (28 pages).
Communication Pursuant to Article 94(3) EPC dated Sep. 11, 2020 From the European Patent Office Re. Application No. 18720380.7. (7 Pages).
Communication Pursuant to Article 94(3) EPC dated Sep. 11, 2020 From the European Patent Office Re. Application No. 18722739.2. (6 Pages).

\* cited by examiner

METHOD AND APPARATUS FOR 3D PRINTING BY SELECTIVE SINTERING

RELATED APPLICATIONS

This application is a National Phase of PCT Patent Application No. PCT/IL2015/050478 having International filing date of May 7, 2015, which claims the benefit of priority under 35 USC § 119(e) of U.S. Provisional Patent Application No. 61/990,165 filed May 8, 2014. The contents of the above applications are all incorporated by reference as if fully set forth herein in their entirety.

FIELD AND BACKGROUND OF THE INVENTION

The present invention, in some embodiments thereof, relates to three dimensional (3D) printing and, more particularly, but not exclusively, to 3D printing by selective sintering.

A number of different processes for fabricating solid objects by 3D printing with successive layers of powdered material are known. Some known 3D printing techniques selectively apply a liquid binder material based on a 3D model of the object, binding the material together layer by layer to create a solid structure. In some processes, the object is heated and/or sintered to further strengthen bonding of the material at the end of the building process.

Selective Laser Sintering (SLS) uses a laser as the power source to sinter layers of powdered material. The laser is controlled to aim at points in space defined by a 3D model, binding the material together layer by layer to create a solid structure. Selective laser melting (SLM) is comparable technique that applies full melting of the material instead of sintering. SLM is typically applied when the melting temperature of the powder is uniform, e.g. when pure metal powders are used as the building material.

U.S. Pat. No. 4,247,508 entitled "Molding process," the contents of which are incorporated herein by reference, describes a molding process for forming a 3D article in layers. In one embodiment, planar layers of material are sequentially deposited. In each layer, prior to the deposition of the next layer, a portion of its area is solidified to define that portion of the article in that layer. Selective solidification of each layer may be accomplished by using heat and a selected mask or by using a controlled heat scanning process. Instead of using a laser to selectively fuse each layer, a separate mask for each layer and a heat source may be employed. The mask is placed over its associated layer and a heat source located above the mask. Heat passing through the opening of the mask will fuse together the particles exposed through the opening of the mask. The particles not exposed to the direct heat will not be fused.

U.S. Pat. No. 5,076,869 entitled "Multiple material systems for selective beam sintering," the contents of which are incorporated herein by reference, describes a method and apparatus for selectively sintering a layer of powder to produce a part comprising a plurality of sintered layers. The apparatus includes a computer controlling a laser to direct the laser energy onto the powder to produce a sintered mass. For each cross-section, the aim of the laser beam is scanned over a layer of powder and the beam is switched on to sinter only the powder within the boundaries of the cross-section. Powder is applied and successive layers sintered until a completed part is formed. Preferably, the powder comprises a plurality of materials having different dissociation or bonding temperatures. The powder preferably comprises blended or coated materials.

U.S. Pat. No. 6,589,471 entitled "Selective inhibition of bonding of power particles for layered fabrication of 3-D objects," the contents of which are incorporated herein by reference, describes a method for fabricating a three-dimensional (3-D) object providing a layer of powder material, and selectively depositing bonding inhibitor on selected areas of the layer of powder material. The areas to be deposited with the bonding inhibitor are selected according to a cross-section design of the 3-D object. The method also includes promoting bonding of uninhibited areas of the entire layer of powder material by either sintering or balk deposition of chemical binders. The method further includes repeating the steps of providing a layer of powder material, selectively depositing bonding inhibitor, and promoting bonding until the 3-D object is formed. US Patent Application Publication No. 20040018107 entitled "Metallic parts fabrication using selective inhibition of sintering (SIS)," the contents of which are incorporated herein by reference, describes a selective inhibition of sintering (SIS) technique to fabricate a three-dimensional (3-D) dense metal object from a binderless metal powder. A number of layers of metal powder are provided on a build tank. For each layer, regions of the layer are sinter-inhibited, e.g., by depositing a sinter-inhibiting material such as a ceramic slurry, a metal salt, or oxidizing metal particles in the powder using chemicals or a concentrated heat source. Each layer may be compacted before the next layer is provided. A final compact may then be sintered. Unwanted sintered sections may be removed from the compact at boundaries formed by the sinter-inhibited (unsintered) regions, and the object extracted.

US Patent Application Publication No. 20080111271 entitled "Reduction of Powder Waste in Selective Inhibition of Sintering," the contents of which are incorporated herein by reference, describes methods and systems for selective inhibition of sintering in 3D fabrication with selective heating arrangements to selectively sinter areas during fabrication thereby reducing waste improving efficiency. The method includes providing a layer of powder material of a type that is changed to a bonded form by heating; causing selective bonding of areas of said layer of powder material by selectively heating parts of areas; and repeating said providing and causing selective bonding, until said bonding results in a desired 3-D object being formed. Bonding is promoted by sintering of uninhibited areas of the layer of powder material. Sintering includes heating at select locations using a hot air heat element.

International Patent Application Publication No. WO 2013/021173 entitled "Method and Apparatus for selectively combining particle material," the contents of which are incorporated herein by reference, describes (i) providing a layer of particulate material to a part bed; (ii) providing radiation to sinter a portion of the material of the layer; (iii) providing a further layer of particulate material overlying the prior layer of particulate material including the previously sintered portion of material; (iv) providing radiation to sinter a further portion of the material within the overlying further layer and to sinter said further portion with the previously sintered portion of material in the prior layer; (v) successively repeating blocks (iii) and (iv) to form a three-dimensional object. At least some of the layers of particulate material are pre-heated with a heater prior to sintering a portion of the material of the respective layer, the heater being configured to move relative to, and proximate, the particulate material.

SUMMARY OF THE INVENTION

According to an aspect of some embodiments of the present invention there is provided a system and method for 3D printing by selective sintering. According to some embodiments of the present invention, an object is formed by an additive manufacturing process that includes printing a mask on a powder layer, compacting the layer including the mask and then sintering the compacted layer. This process is typically repeated for each layer until the object is formed. The present inventor has found that adding the compacting step on a per layer basis can improve the efficiency of the manufacturing process and can also improve a quality of the end product.

According to an aspect of some embodiments of the present invention there is provided a system for building a three dimensional object including: a powder delivery station for applying a layer of powder material on a building tray; a digital printing station for printing a mask pattern on the layer, wherein the mask pattern defines a negative of a portion of the layer to be sintered, said portion exposed; a sintering station for selectively sintering the portion of the layer that is exposed; and a stage for repeatedly advancing the building tray to each of the powder delivery station, digital printing station and sintering station to build a plurality of layers that together form the three dimensional object.

Optionally, the system includes a die compaction station for compacting per layer of powder material, wherein the compaction station includes a die for receiving the layer.

Optionally, the die compacting station includes a heating element for warming a surface of the die that interfaces with the layer.

Optionally, the die compacting station is operable to apply up to 100 MPa of pressure on the layer.

Optionally, the die compacting station includes a lifting system for lifting the building tray toward the die.

Optionally, the compacting station includes an anti-peeling mechanism, the anti-peeling mechanism including a foil positioned between the die, wherein the foil is supported by two opposite edges to allow bowing of the foil during separation between the building tray and the die.

Optionally, the system includes a controller for adjusting height of the building tray in a subsequent layer responsive to a thickness of the layer after compaction.

Optionally, the system includes a cooling station for cooling the layer after sintering.

Optionally, the cooling station includes air knives for providing jet stream of gas to cool the layer.

Optionally, the digital printing system is operable to dispense ink including frit suspended in a liquid carrier.

Optionally, frit is formed from particles having a diameter of between 500 nm to 1 μm.

Optionally, the sintering station includes a high thermal mass roller for sintering the layer.

Optionally, the high thermal mass roller is heated to 0°-80° C. above a melting temperature of the powder.

Optionally, the high thermal mass roller applies a pressure in the order of magnitude of 20-180 N/cm of roller length.

Optionally, the sintering station includes an anti-peeling mechanism, the anti-peeling mechanism including a foil positioned between the high thermal mass roller and the layer.

Optionally, the sintering station includes an array of vertical-cavity surface-emitting lasers (VCSEL) that swept over the layer for pre-heating and/or sintering.

Optionally, the building tray includes at least one channel running substantially parallel to a surface of the tray on which the layer is positioned, through which fluid is introduced for cooling the building tray.

Optionally, the powder is metal powder.

Optionally, the powder is aluminum powder and/or aluminum alloy.

According to an aspect of some embodiments of the present invention there is provided a method for building a three dimensional object including: spreading a layer of powder on a building tray; printing a mask pattern on the layer, wherein the mask pattern defines a negative of portion of the layer to be sintered, said portion exposed, the mask pattern for the layer is defined by mask pattern data defining a shape of the three dimensional object; sintering the portion of the layer that is exposed; and repeating the spreading printing and sintering until the three dimensional object is completed.

Optionally, the mask pattern is printed with a digital printer that dispenses ink.

Optionally, the ink provides an insulating coating on a masked portion of the layer.

Optionally, the ink includes a liquid carrier selected to have an evaporation temperature that is lower than a melting temperature of the powder.

Optionally, the method includes performing die compaction per layer prior to the sintering.

Optionally, the method includes performing warm die compaction.

Optionally, the pressure applied on the layer during compaction is up to 100 MPa.

Optionally, the die compaction is performed per layer after the printing of the layer.

Optionally, the method includes cooling the building tray during the die compaction.

Optionally, the sintering is performed by passing a heat source over a length of the building tray, wherein the heat source provides heat along a narrow strip that extends over a width of the building tray.

Optionally, the sintering is performed with a high thermal mass roller rolling over the layer.

Optionally, the high thermal mass roller is heated to 0°-30° C. above a melting temperature of the powder during the sintering.

Optionally, the high thermal mass roller is pressed against the layer with a pressure in the order of magnitude of 10 N/cm of roller length.

Optionally, the method includes cooling the building tray during sintering.

Optionally, the method includes cooling the layer immediately after the sintering, wherein the cooling is performed with a jet stream of gas.

Optionally, the method includes adjusting height of the building tray responsive to a thickness of one or more previous layers of the object being built.

According to an aspect of some embodiments of the present invention there is provided a method for building a three dimensional object including: providing a layer of powder on a building tray; performing die compaction on the layer; sintering the layer that is die compacted by selective laser sintering or selective laser melting; and repeating the providing, the die compaction and the sintering per layer until the three dimensional object is completed.

Optionally, the method includes performing warm die compaction.

Optionally, the pressure applied on the layer during compaction is up to 100 MPa.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
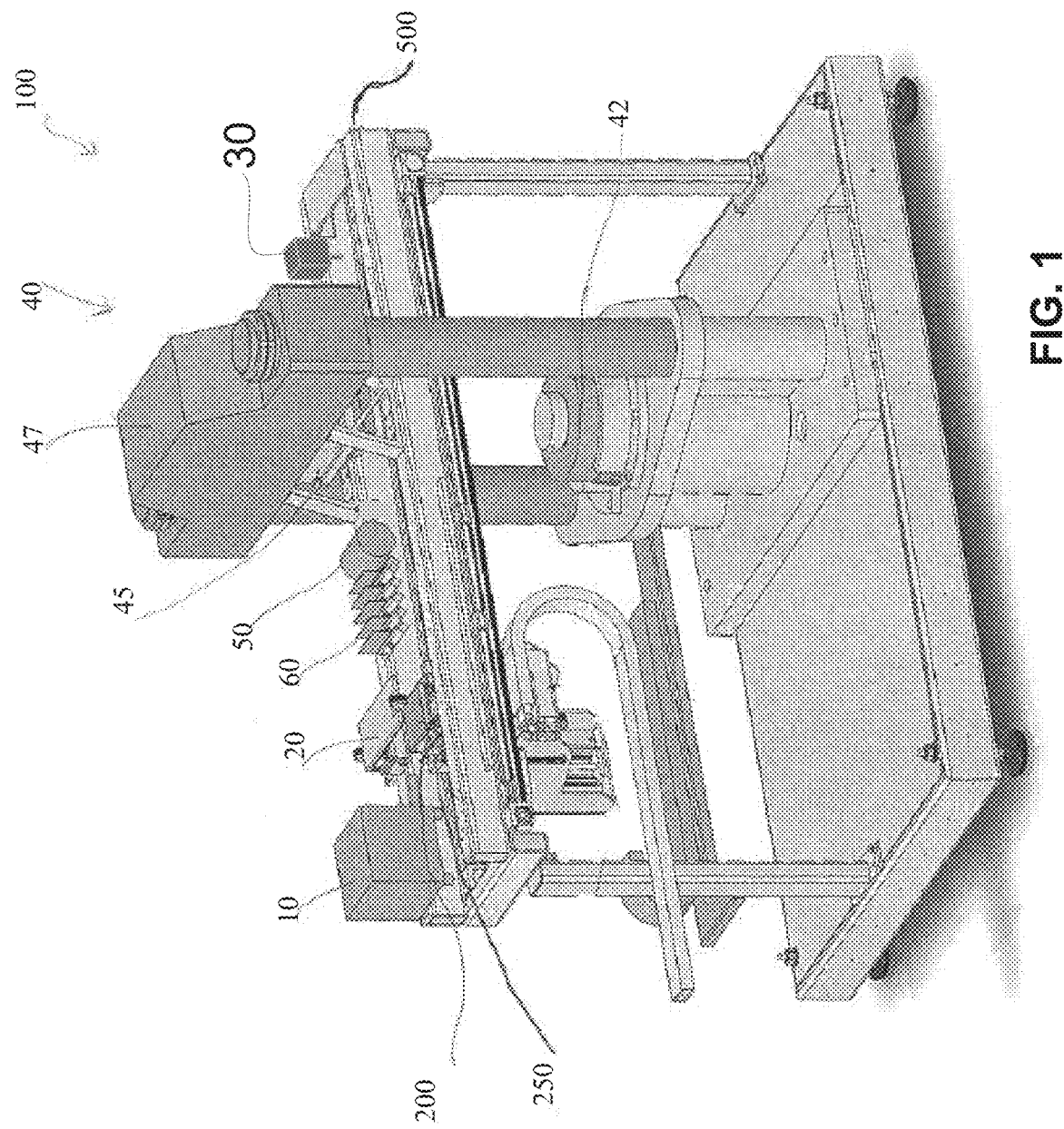
FIG. 1 is a simplified schematic drawing of an exemplary 3D printing system in accordance with some embodiments of the present invention.

The present invention, in some embodiments thereof, relates to three dimensional (3D) printing and, more particularly, but not exclusively, to three dimensional printing by selective sintering.

According to some embodiments of the present invention, there is provided a 3D printing system and method for building an object from multiple layers of sintered powder. According to some embodiments of the present invention, the system includes a building tray on which a powder dispenser applies powdered material on a per layer basis and a roller spreads each layer of powder once applied. Optionally, powder dispensing and powder spreading is performed in a powder delivery station of the system. According to some embodiments of the present invention, a powdered metal is used as the building material. In some exemplary embodiments, aluminum powder is used. Optionally, a metal alloy is used, e.g. an aluminum alloy or a combination of powder metal is used. Optionally, a ceramic powder is used as the building material and/or a combination of metal and ceramic powder.

Building with aluminum is known to be advantageous due to its light weight, relatively low melting temperature and its resistance to corrosion. One of the challenges of building with aluminum powder is that the aluminum particles of the powder tend to form an aluminum oxide coating, e.g. alumina. The aluminum oxide coating introduces a barrier between the aluminum particles that interferes with bonding of the particles during sintering. The final result is typically an object with reduced strength due to poor bonding between the powdered elements.

Additional challenges come into play when applying an SLS and/or SLM process for building with aluminum. Molten aluminum is known to provide a poor wetting surface for receiving additional layers. It is known to add tin and other additives to provide an improved wetting surface. However, the addition of tin and other additives reduces the strength of the final product that is built. In addition, the molten layer suffers from coalescence between adjacent molten drops by the scanning laser beam, due to the poor previous layer wetting. The final result is again an object with reduced strength and inaccurate dimensions. It is known to add an exoskeleton to the object as it is built to provide additional stability, and to reduce internal stress, e.g. due to dimensional variations. This exoskeleton is later removed. Removing the exoskeleton is typically a cumbersome process.

According to an aspect of the present invention, there is provided an improved three dimensional (3D) printing system and method that can also be applied to building objects with pure metals such as aluminum. It is noted that the system and method is not limited for use with pure aluminum and can also be used for building with metal alloys, ceramics and/or a combination of different materials.

According to some embodiments of the present invention, the system includes a digital printer that prints a mask on the powder bed on a per layer basis based on a stored digital mask pattern. Typically, the mask pattern is negative of the object at a particular cross section being printed. According to some embodiments of the present invention, the ink applied by the printer includes heat insulating material, e.g. glass or silicon frit suspended in a liquid carrier, e.g. oil and/or organic solvent. Typically, the ink provides for retarding sintering of the powder material during the sintering process and at the location on which the ink is applied.

According to some embodiments of the present invention, the system includes a die compacting station for compacting the layer of powder in a die prior to sintering. Typically, compaction is applied to increase the density of the powder layer and/or remove air. In some exemplary embodiments, the compaction strength applied is defined to provide permanent deformation of the powder layer, e.g. press the powder particles past its elastic state and into its plastic state. Optionally, heating is applied during compaction so that a state of permanent deformation can be achieved at lower compaction pressures. Typically, the density and thereby the mechanical strength of the object is improved by compaction. According to some embodiments of the present invention, the compaction promotes bonding during sintering by breaking up the alumina layer to expose the aluminum and allow direct engagement between aluminum particles of the powdered material. Optionally, compaction increases thermal conductivity of the powder layer and allows for more uniform sintering. Optionally, compaction improves the bonding between layers and prevents layer separation that may occur after sintering. According to some embodiments of the present invention, die compaction per layer is applied to known SLM and SLS processes for building a 3D object.

According to some embodiments of the present invention, the system includes a sintering station for sintering the compacted layer. According to some embodiments of the present invention sintering is performed with a sintering roller, e.g. a high thermal mass roller. In some exemplary embodiments, the roller is heated to a temperature that is slightly above a melting temperature of the powder material, e.g. 0°-80° C. above the melting temperature and is pressed against the layer with a pressure of about 20-180 N/cm of roller length. Typically, the applied pressure ensures substantial to full contact between the roller surface and the layer. Typically, the pressure applied promotes adhesion between the layers. In some exemplary embodiments, the temperature of the roller together with the speed of rotation is defined so that adequate melting of the unmasked portion can be achieved prior to substantial evaporation of the liquid carrier in the masked portion. Typically, liquid carrier has a lower boiling temperature than the melting temperature of the powder material so that in the masked portion evaporation of the liquid carrier occurs prior to melting of the powder material. In the unmasked portion, there is no liquid carrier, so that substantially all the energy transfer is used for melting the powder material. This results in aluminum melting at the model trajectory prior to aluminum melting at the masked trajectory. If this time delay is properly used, the model trajectory will be solidified and bonded to the previous layer while the masked trajectory will not. In some alternative embodiments of the present invention, sintering is achieved with an array of vertical-cavity surface-emitting lasers (VCSEL) that sweep over the layer for sintering. In some additional alternative embodiments of the present invention, sintering is achieved with the roller and an array of vertical-cavity surface-emitting lasers (VCSEL) is used for layer preheating. This preheating can shorten the sintering period and can reduce potential contamination of the sintering roller.

According to some embodiments of the present invention, the system optionally includes an anti-peeling mechanism for reducing and/or preventing peeling of the powder layer on contact surface, e.g. the sintering roller and/or the die. In some exemplary embodiments, the anti-peeling mechanism includes a foil and/or film positioned between the powder layer and a contact surface that maintains contact with the powder layer after initial disengagement of the contact surface and then separated from the powder layer in a gradual manner. Typically, the presence of the foil prevents any peeling on the contact surface. In some exemplary embodiments, the gradual separation of the foil also prevents and/or reduces peeling of the powder layer on the foil.

According to some embodiments of the present invention, the system additionally includes a cooling station for cooling the layer. Typically, cooling is applied immediately after the selective sintering so that the applied heat does not penetrate and/or leak into masked non-sintered areas over time. Typically, cooling is applied with one or more air-knives. Typically, nitrogen gas is used for cooling.

According to some embodiments of the present invention, a building tray is advanced on a precision stage to each of the plurality of stations including the powder dispensing station, the powder spreading station, the printing station, the compacting station, the sintering station and the cooling station. In some exemplary embodiments, the tray reverses directions when leaving the printing station and compaction, heating sintering and cooling is performed as the tray moves back in a direction toward the powder dispensing station. Typically, this back and forth motion is repeated for each layer printed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
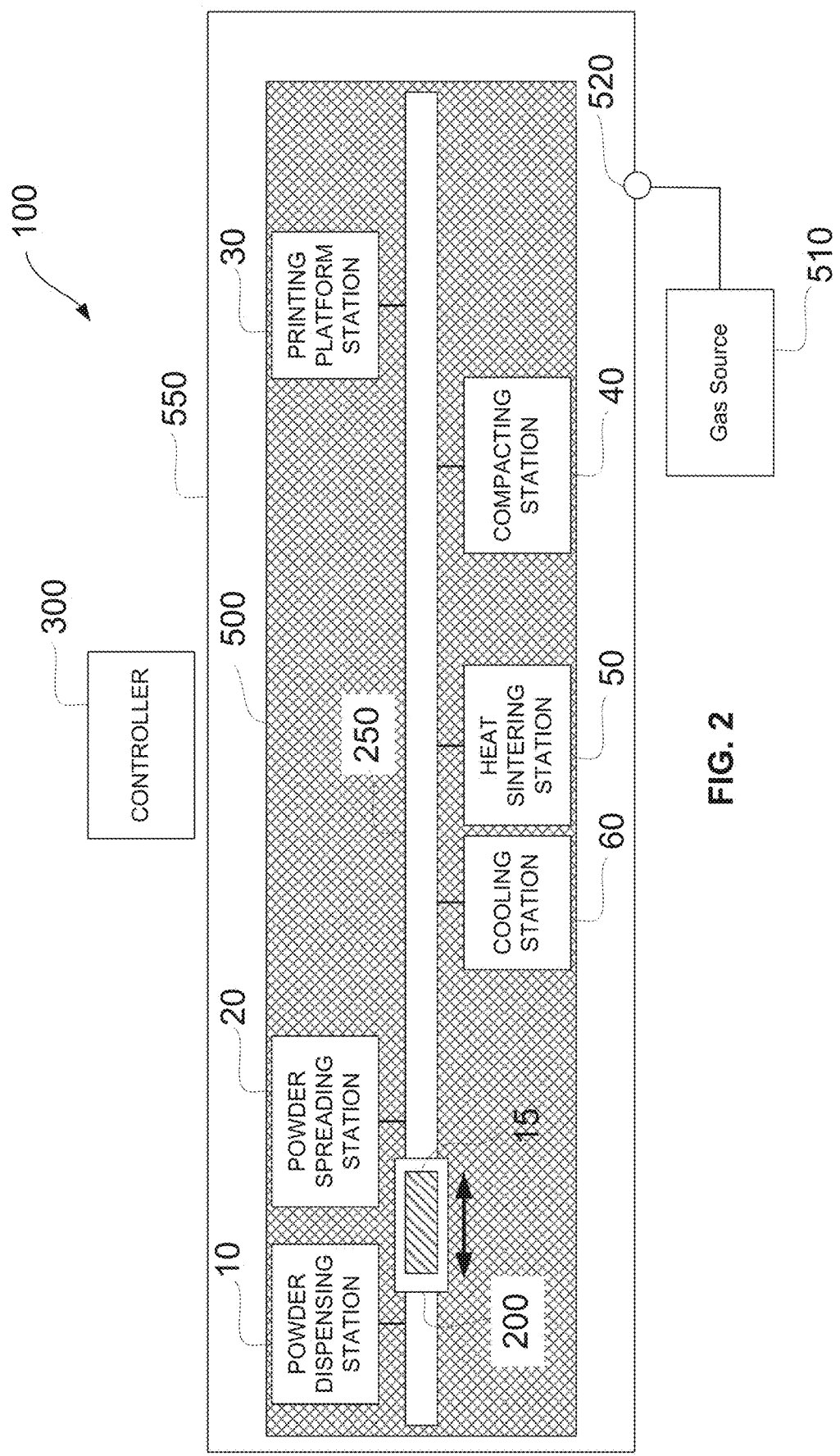
FIG. 2 is a simplified block diagram showing exemplary units of an exemplary 3D printing system in accordance with some embodiments of the present invention.

Referring now to the drawings, FIG. 1 shows a simplified schematic drawing and FIG. 2 shows a simplified block diagram of an exemplary 3D printing system in accordance with some embodiments of the present invention. According to some embodiments of the present invention, a 3D printing system 100 is integrated on a working platform 500. According to some embodiments of the present invention, working platform 500 includes a precision stage 250 on which a building tray 200 is advanced through a plurality of stations for printing an object 15 one layer at a time. Typically, precision stage 250 is a linear stage, e.g. an X-Z stage providing motion along a single axis, e.g. an X axis while building a layer and also providing motion in the vertical direction (Z-axis) for adjusting height of tray 200, e.g. lowering tray 200 as each new layer is added.

According to some embodiments of the present invention, working platform 500 includes a powder dispensing station 10 for dispensing a powder layer on tray 200, a powder spreading station 20 for spreading a layer of dispensed powder, a printing platform station 30, for printing a mask on the layer of powder according to a mask pattern, a compacting station 40 for compacting the layer of powder prior to sintering, a sintering station 50, for sintering the compacted layer and a cooling station for cooling the sintered layer. Typically for each layer printed tray 20 advances to each of the stations and then repeats the process until all the layers have been printed. In some exemplary embodiments, tray 20 is advanced in one direction with stops at powder dispensing station 10, powder spreading station 20 and printing platform station 30 and then reverses direction back toward powder dispensing station 10 with stops at compacting station 40, sintering station 50 and cooling station 60 for completing a current layer. According to some embodiments of the present invention, a controller 300 controls operation of 3D printing system 100 and coordinates operation of each of the stations with positioning and/or movement of tray 200 on precision stage 250. Typically, controller 300 includes and/or is associated with memory and processing ability.

In some exemplary embodiments, one or more stations along a path of precision stage 250 are supported on rails extending along the path and/or by one or more bridges, e.g. bridge 47 positioned over working platform 500. In some exemplary embodiments, compacting station 40 includes a piston 42 positioned below working platform 500 that is operated to raise tray 200 toward a flattening surface positioned above tray 200 as is described in further detail herein below.

Typically, working platform 500 is covered with a hood 550. According to some embodiments of the present invention, a gas source 510 includes an inlet 520 through hood 550 and provides a positive flow of non-combusting gas to the working area under hood 550 for safety, e.g. to avoid possible combustion of the materials during the manufacturing process. Typically, gas source 510 is nitrogen.

Figure 3:
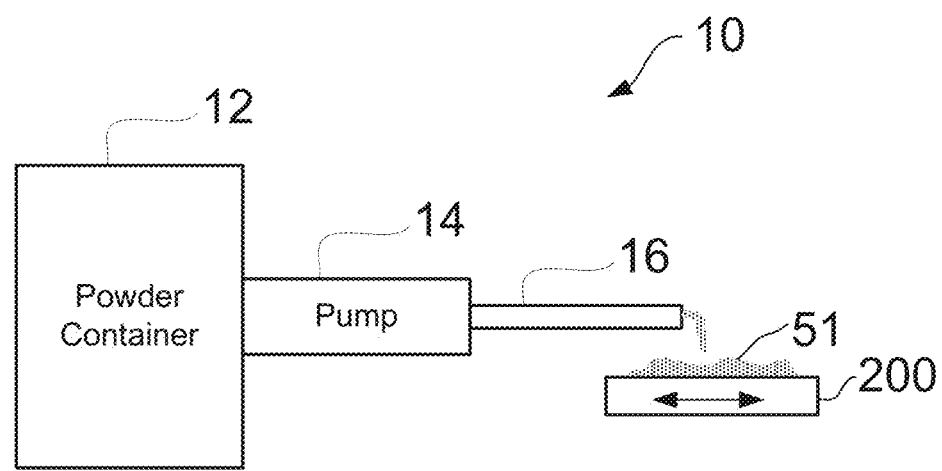
FIG. 3 is a simplified block diagram of powder dispensing station in accordance with some embodiments of the present invention.

Reference is now made to FIG. 3 showing a simplified block diagram of powder dispensing station in accordance with some embodiments of the present invention. Typically, powder dispensing station 10 includes a container 12 storing powder 55, a pump 14 for extracting a defined quantity and/or volume of powder 55 through a tube 16 and onto tray 200. In some exemplary embodiments, the defined volume is adjusted over the course of the building process based on feedback from system 100 and/or controlled 300. In some exemplary embodiments, a thickness of a layer after compaction is monitored and the defined volume dispensed by powder dispensing station 10 is adjusted responsive to a thickness of the compacted layer(s). Optionally, powder 55 is dispensed while tray 200 is in motion so that powder 55 is spread over a length of try 200. In some exemplary embodiments, powder dispensing station 10 is adapted to deliver powder aluminum. In other exemplary embodiments, other metals and/or alloys are stored and delivered by powder dispensing station 10. Optionally, container 12 includes a plurality of components that are mixed. Optionally, container 12 includes a mechanism for mixing contents stored.

Figure 4:
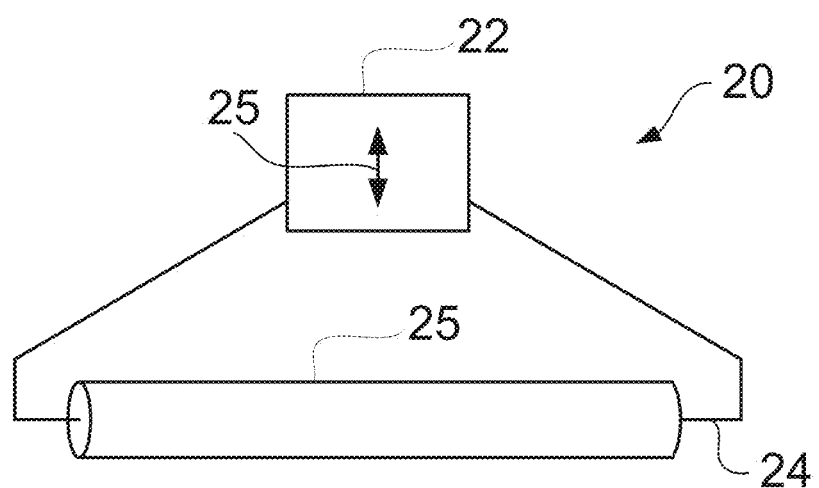
FIG. 4 is a simplified block diagram of powder spreading station in accordance with some embodiments of the present invention.

Reference is now made to FIG. 4 showing a simplified block diagram of powder spreading station in accordance with some embodiments of the present invention. Typically, spreading station 20 includes a motorized roller 25 rotatably mounted on an axle 24. In some exemplary embodiments, a linear motor 22 engages axle 24 and moves back and forth for spreading an even layer of powder. In some exemplary embodiments, a height of table 200 is adjusted, e.g. moved up/down with a Z stage in order to obtain a defined layer thickness. In some exemplary embodiments, a powder layer of about 150 μm in thick, e.g. 100 μm in to 200 μm in thick is spread with roller 25. In some exemplary embodiments, a thickness of a layer after compaction is monitored and a height of table 200 is adjusted to alter a thickness of a current layer to compensate for drifts in layer thicknesses of one or more previous layers.

In some exemplary embodiments, roller 25 extends substantially over an entire length of tray 200 and only one pass of the roller is required to spread the powder. Alternatively, roller 25 extends over less than the entire length of tray 200 and a plurality of passes is required. Optionally, roller 25 is operated while tray 200 is in motion. Optionally, roller 25 is held at a height above tray 200 and is lowered as required for spreading.

Figure 5:
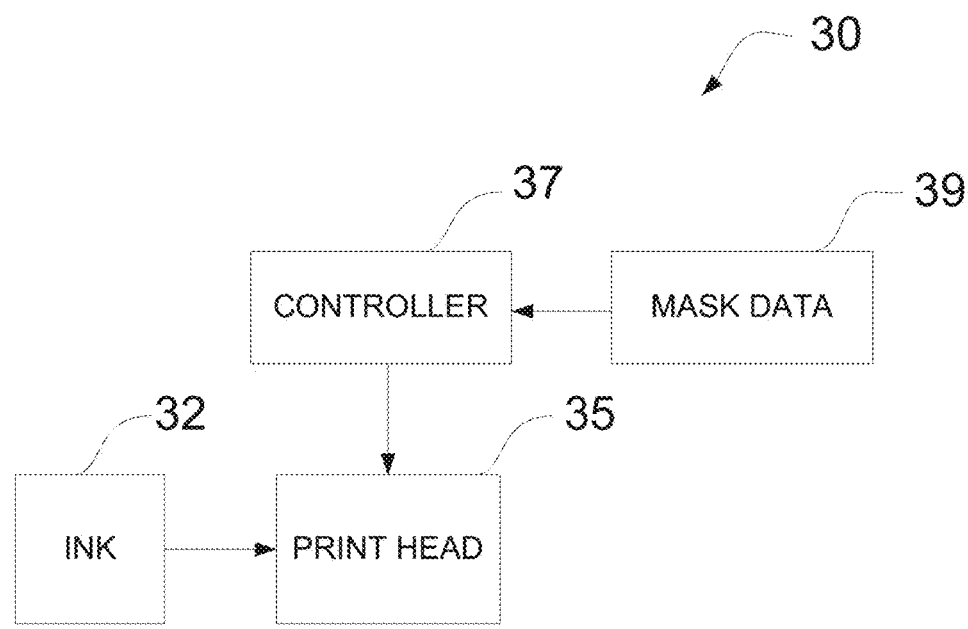
FIG. 5 is a simplified block diagram of an exemplary printing system in accordance with some embodiments of the present invention.

Reference is now made to FIG. 5 showing a simplified block diagram of an exemplary printing system in accordance with some embodiments of the present invention. According to some embodiments of the present invention, print platform station 30 includes a direct inkjet printing head 35 that deposits ink 32 based on a generated mask pattern data 39. In some exemplary embodiments, print head 35 is stationary and printer controller 37 together with system controller 300 control timing for depositing ink as tray 200 advances under print head 35. Optionally, printing head is mounted on a Y axis stage and moves in a direction perpendicular to tray 200.

Alternatively, tray 200 is stationary during printing and printing head 35 is supported by an X, Y or XY stage for moving print head 35 in one or more directions. Typically, print head 35 includes an array of nozzles through which ink is selectively deposited. According to some embodiments of the present invention, print head 35 forms a mask and/or a negative of the object to being constructed. Typically, the mask pattern is defined by mask data 39 that is typically stored in memory. Typically, the mask data is generated by a computer aided design (CAD) software program or the like. Optionally, a pixel size of the printed pixel is in an order of magnitude of 50 μm, e.g. between 50 μm-300 μm.

According to some embodiments of the present invention, ink 32 includes particles suspended in a liquid carrier. Typically, the liquid carrier is oil or oil based. According to some embodiments of the present invention, the glass and/or silicon particles and/or frit have an average diameter that is less than 1 μm, e.g. 500-600 nm. In some exemplary embodiments, the concentration of the glass frit in the ink solution is up to 50%. Typically, the particles are formed from an insulating material that provides insulating surfaces while the liquid carrier penetrates the powder layer. Typically, the insulation provided by ink 32 only retards a rise in temperature of the masked portion. Typically, the glass frit is significantly smaller than the powder particles, e.g. the powder particles have a diameter of about 40 μm while the glass frit has a diameter of about 500-600 nm.

Figure 6:
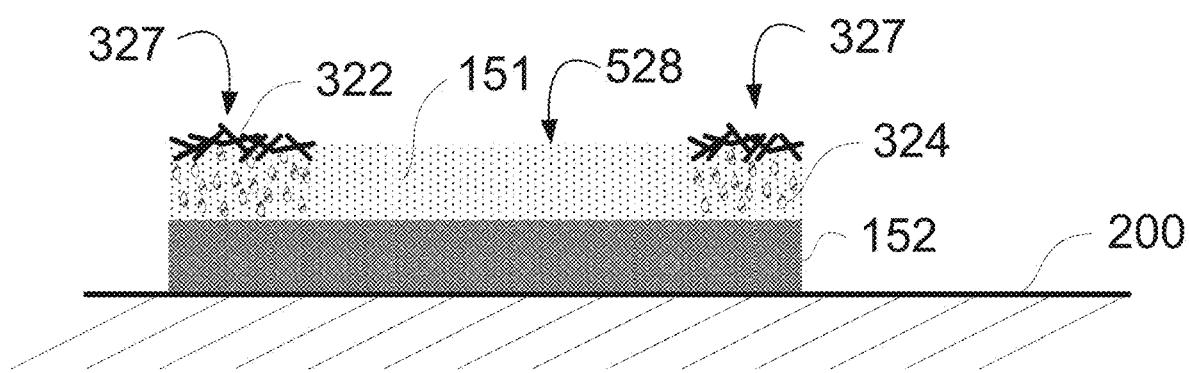
FIG. 6 is a simplified schematic representation of an object layer including a printed mask in accordance with some embodiments of the present invention.

Reference is now made to FIG. 6 showing a simplified schematic representation of an object layer including a printed mask in accordance with some embodiments of the present invention. According to some embodiments of the present invention, a powder layer 151 includes a mask portion 327 on which ink 32 is deposited and an unmasked portion 528 where no ink is deposited. Typically, unmasked portion only includes powder material and does not include additives. It is noted that although mask portion 327 is shown near the edges in FIG. 6, the mask portion can appear in other portions of layer 151.

Typically, ink 32 includes glass frit 322 that collects on the upper surface of the masked portion and oil 324 that penetrates through the powder layer 151. Typically, oil 324 has an evaporation temperature that is lower than a melting temperature of the powder in powder layer 151. According to some embodiments of the present invention, both frit 322 and oil 324 provide for retarding sintering of masked portion 327. Optionally, frit 322 provides an insulating upper surface and oil 324 soaks the interior portion of powder layer 151 so that any heat penetrating through frit 322 is directed toward evaporating oil 324. In some exemplary embodiments, the duration and temperature of sintering is defined to provide for sintering unmasked portion 528 without sintering masked portion 327.

Figure 7A:
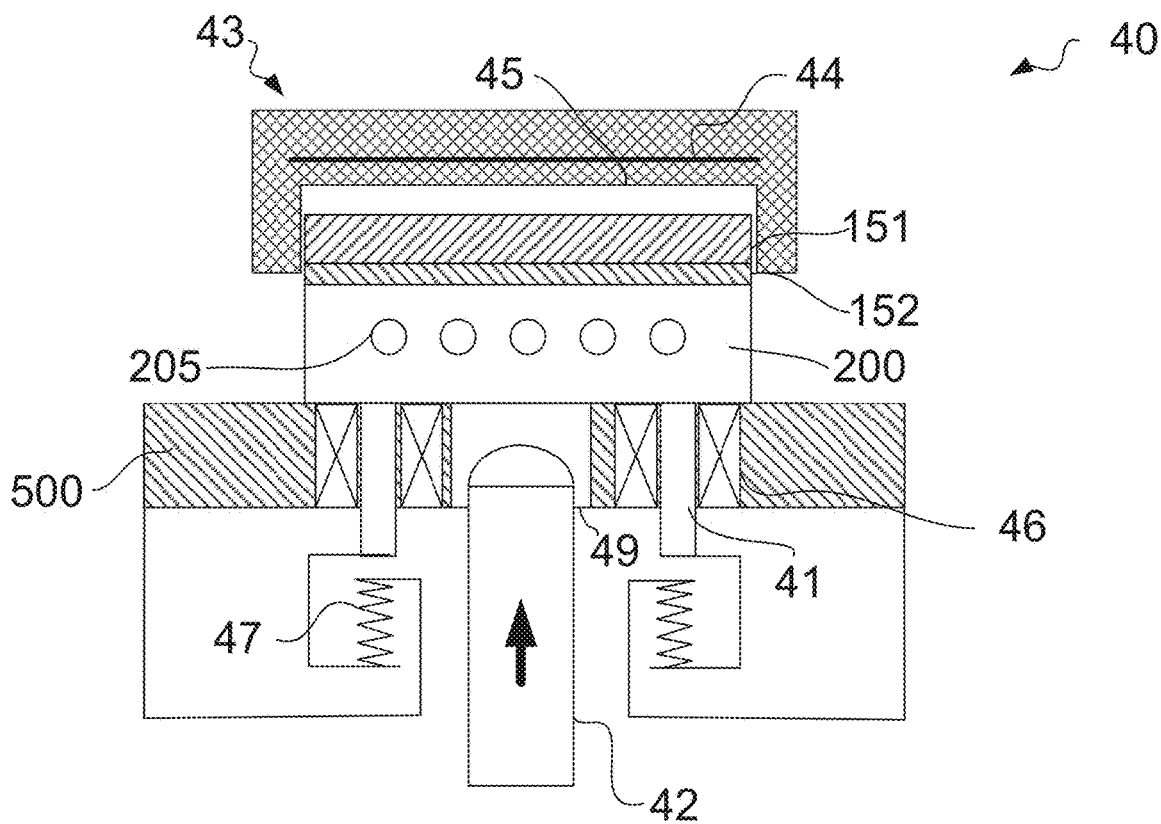
FIGS. 7A and 7B are simplified schematic drawings of an exemplary compacting system in a released and compressed state respectively in accordance with some embodiments of the present invention.
Figure 7B:
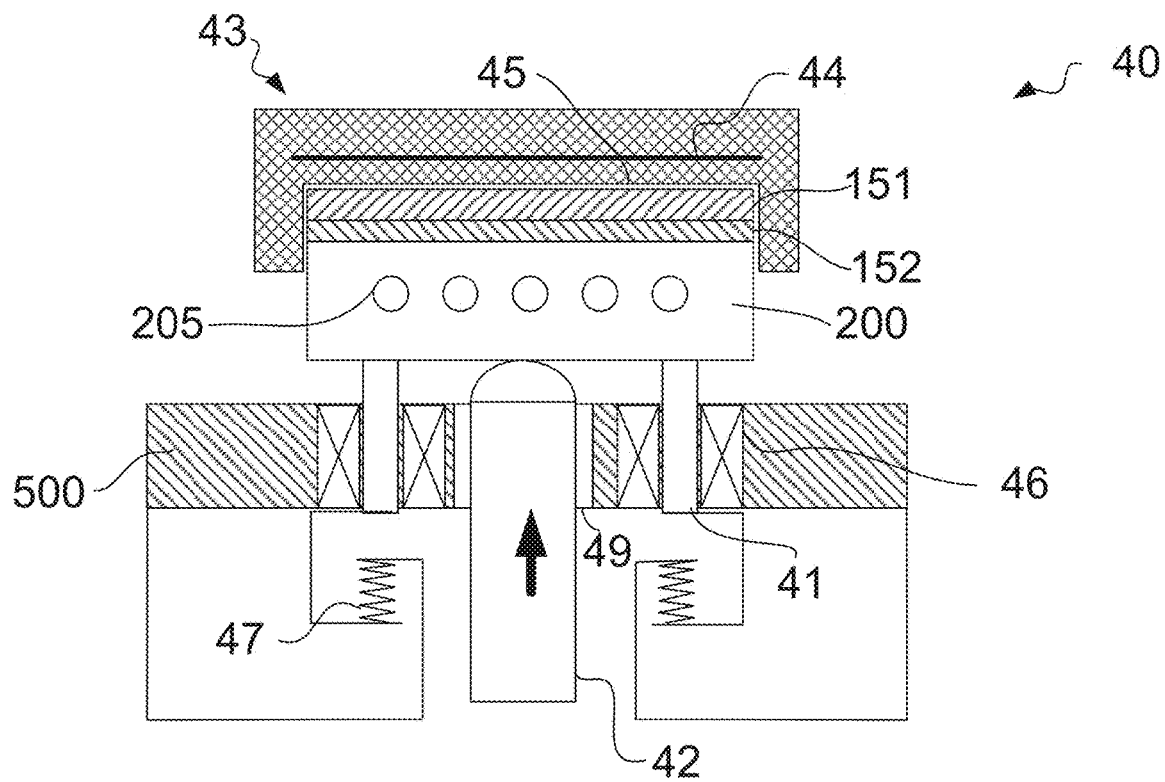

Reference is now made to FIGS. 7A and 7B showing a simplified schematic drawings of an exemplary die compaction station shown in a released and compressed state respectively in accordance with some embodiments of the present invention. According to some embodiments of the present invention, a powder layer is compacted prior to sintering. According to some embodiments of the present invention, as the compaction process it performed per each layer, the compaction station generates a die per layer.

In some exemplary embodiments, die compaction is performed after printing a mask pattern on the powder layer. Alternatively, die compaction is performed prior to printing or performed both before and after printing. According to some embodiments of the present invention, the compaction station includes a piston 42 that is operative to provide the compaction pressure for compacting a powder layer 151. According to some embodiments of the present invention, during compaction, piston 42 is raised through a bore 49 in working platform 500 or precision stage 250 and lifts building tray 200 towards a die and/or surface 45 positioned above tray 200.

In some exemplary embodiments, tray 200 is secured to one or more linear guides 41 that ride along linear bearings 46 as piston 42 elevates and/or lowers tray 200. Optionally, tray 200 is lifted against one or more compression springs 47. In some exemplary embodiments, gravitational force as well as springs 47 provide for lowering piston 42 after compacting layer 151.

According to some embodiments of the present invention, a pressure of up to 100 MPa is applied to compact a powder layer. Typically, the applied pressure provides for removing air and bringing powder layer 151 past its elastic state so that permanent deformation of the layer is achieved. Optionally, the compaction provides for removing 95% to 99% of the air in layer 151. Optionally, compaction reduces the thickness of a layer by around 50%.

In some exemplary embodiments, warm die compaction is performed and upper surface 45 of die 43 and/or the entire die 43 is heated, e.g. pre-heated with a heating element 44 during compaction. Typically, when heating surface 45 and/or die 43, layer 151 can reach its plastic and/or permanent deformation state with less pressure applied on the layer. Optionally, upper surface 45 is heated to a temperature of 150° C., e.g. 150°-300° C. Typically there is a tradeoff between compaction temperature and pressure. Increasing the temperature during compaction may provide for reaching plastic deformation at lower pressure but also may lead to undesired evaporation of ink deposited in the layer. On the other hand, reducing temperature of upper surface 45 may reduce the energy efficiency of the compaction since higher pressure may be required. Typically, the pressure and temperature applied is defined based on the material of the powder and the thickness of layer 151.

In some exemplary embodiments, table 200 is water cooled to provide stable temperature of layer 152. Optionally, table 200 includes a plurality of passages and/or channels 205 though which water and/or other coolant flow is introduced. Optionally, temperature and flow rate of the fluid through passages 205 is defined to maintain table 200 at a desired temperature, e.g. up to about 10° C. above ambient temperature. Typically, this cooling mechanism is also applied during sintering.

In some exemplary embodiments, e.g. when aluminum powder is used, the compaction is operative to break up the oxide layer, e.g. the alumina on the powdered particles. Typically, exposing the aluminum promotes direct engagement between aluminum particles of the powdered material and improves bonding of the particles during sintering.

According to some embodiments of the present invention, height of the object, e.g. height of one or more layers of the object as it is being built, is detected, determined and/or sensed at the compaction station. Optionally, a height of tray 200 while pressed in die 43 and/or against surface 45 is detected. According to some embodiments of the present invention, controller 300 (FIG. 2) monitors the height and/or the change in height and provides input to powder dispensing station and/or Z stage of tray 200 when adjustments in layer thicknesses are required to compensate for a drift from a desired height and/or change in height. In some exemplary embodiments, controller 300 uses one or more lookup tables stored in memory to control adjustments in layer thicknesses.

Figure 8A:
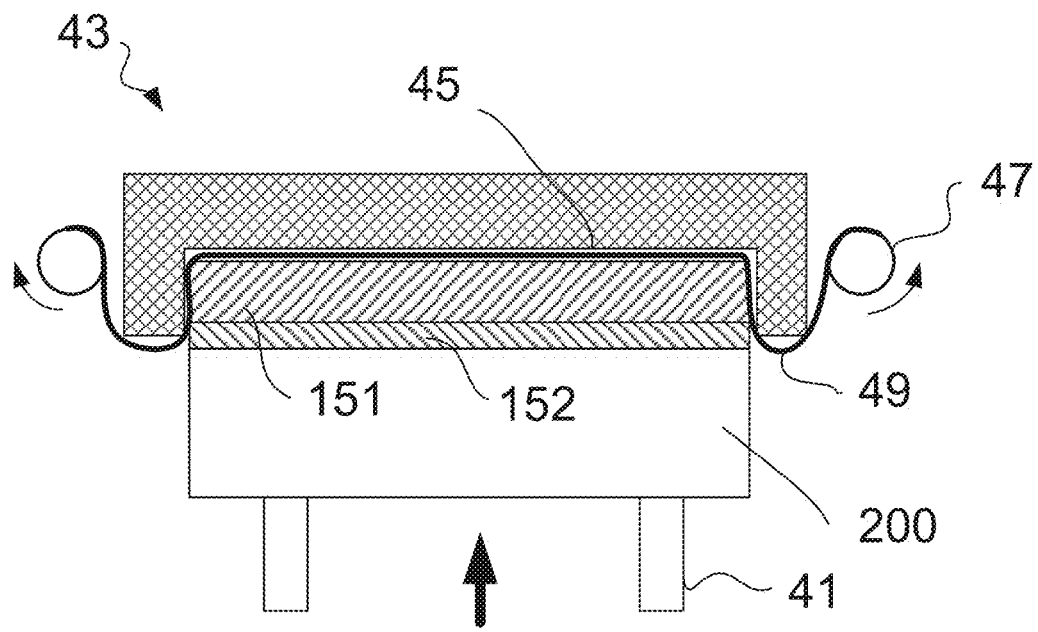
FIGS. 8A and 8B are simplified schematic drawings of an exemplary anti-peeling mechanism for a compacting system in a compacting state and a post compacting state respectively in accordance with some embodiments of the present invention.
Figure 8B:
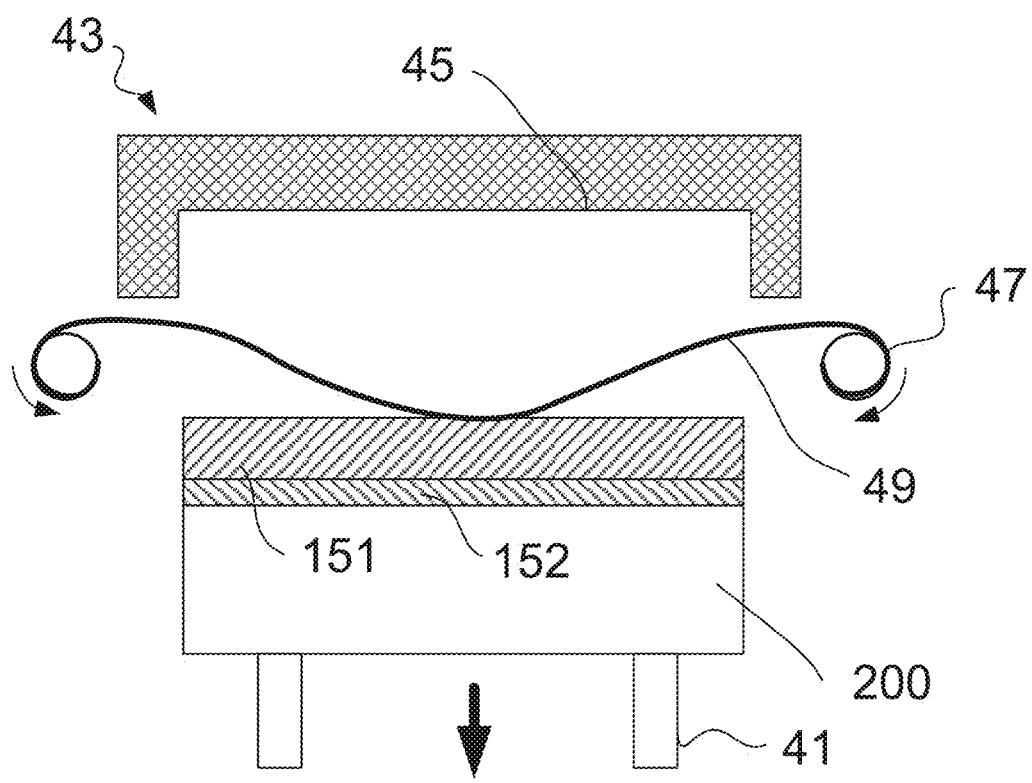

Reference is now made to FIGS. 8A and 8B showing a simplified schematic drawings of an exemplary anti-peeling mechanism for a compacting system shown in a compacting state and a post compacting state respectively both in accordance with some embodiments of the present invention. According to some embodiments of the present invention, a foil and/or film 49 supported on rollers 47 is positioned between layer 151 and upper surface 45 during compaction. Optionally, the foil has a thickness between 0.1-0.3 mm, e.g. 0.2 mm. Optionally, the foil is a stainless steel 304L or 316L foil. Typically, foil 49 protects upper surface 45 from accumulating powder and ink particles and also prevents substantial peeling of layer 151 during separation of upper surface 45. In some exemplary embodiments, foil 49 is wound with rollers 47 to stretch foil 49 on surface 45 by prior to compaction and then foil 49 is partially unwound as tray 200 is lowered. The extra length of foil 49 due to unwinding allows foil 49 to gradually detach from layer 151 as layer 151 is lowered. Optionally, the separation provided by pulling one or two opposite edges of foil 49 provides for separation by line separation instead of full surface separation. The present inventor has found that this gradual detachment of the foil avoids peeling and/or loss of material from layer 151 on foil 49.

Figure 9:
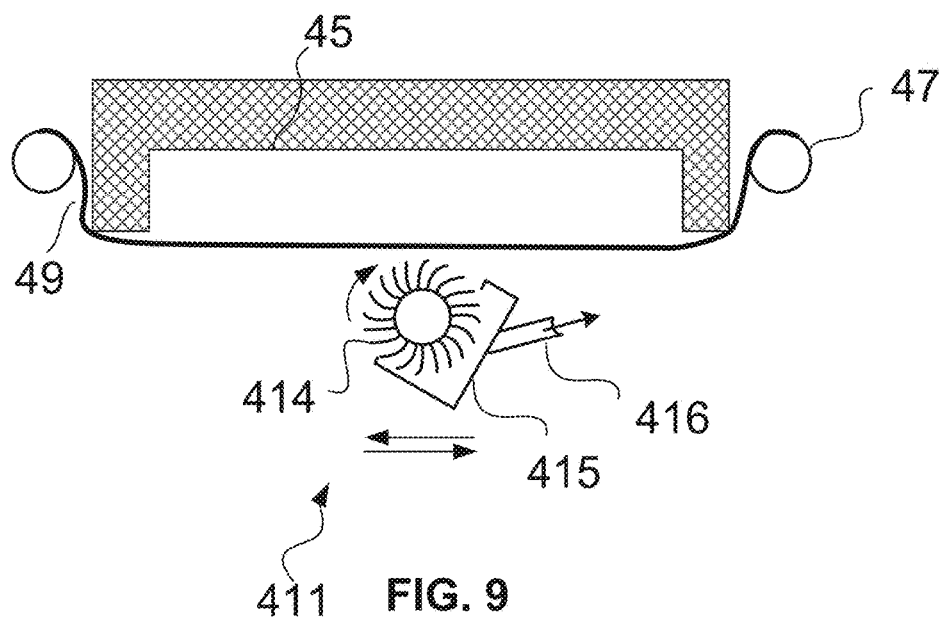
FIG. 9 is a simplified schematic drawing of a cleaning mechanism for a compacting system in accordance with some embodiments of the present invention.

Reference is now made to FIG. 9 is a simplified schematic drawing of a cleaning mechanism for a compacting system in accordance with some embodiments of the present invention. According to some embodiments of the present invention, compacting station 40 includes a cleaning unit 411 for cleaning foil 49 (or surface 45 when foil 49 is not used). In some exemplary embodiments, cleaning unit 405 includes a rotation brush 414 that sweeps over foil 49. Optionally, brush 414 is partially covered by a collection hood 415 and powder is removed by brush 414 is removed with a suction port 416. In some exemplary embodiments, cleaning unit is driven along a rail 417 that mounted on working platform and/or frame 500.

Figure 10:
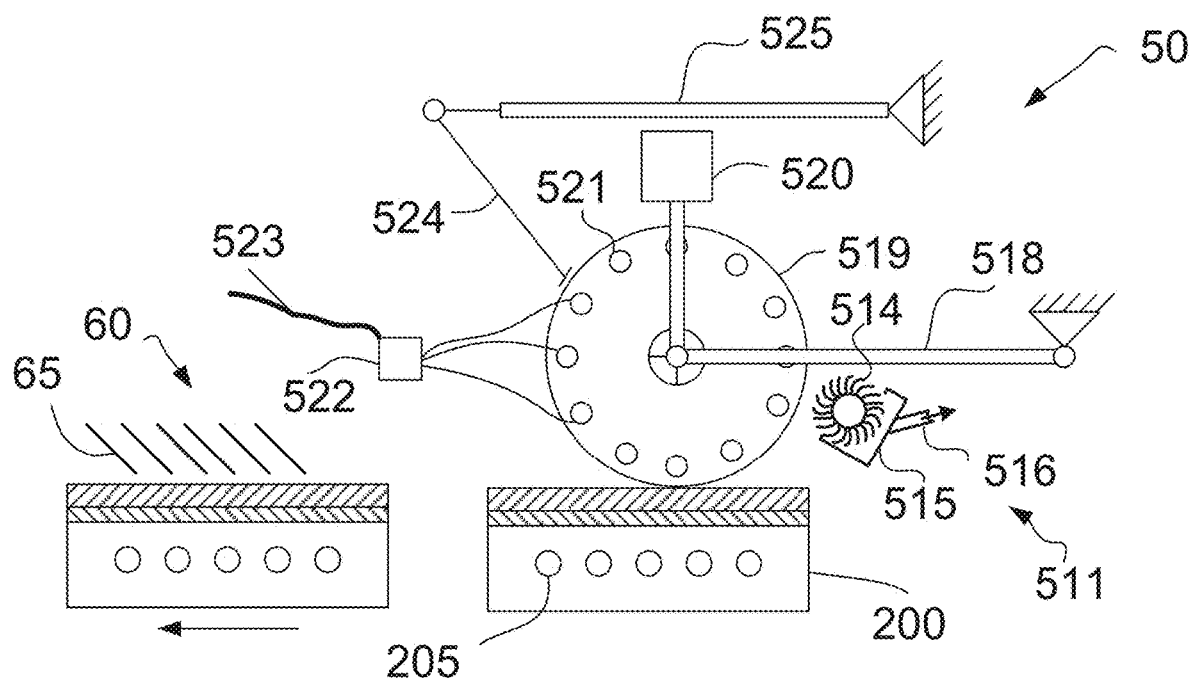
FIG. 10 is a simplified schematic drawing of exemplary sintering station and cooling station in accordance with some embodiments of the present invention.

Reference is now made to FIG. 10 is a simplified schematic drawing of exemplary sintering station in accordance with some embodiments of the present invention. According to some embodiments of the present invention, an object 15 is sintered one layer at a time with a sintering roller 519. According to some embodiments of the present invention, sintering roller 519 is a high thermal mass roller. Optionally, sintering roller 519 is formed from hard polished steel. In some exemplary embodiments, sintering roller 519 is heated to a temperature that is slightly above a melting temperature of the powder material, e.g. 0°-80° C. above the melting temperature and is pressed against the layer with a pressure of about 20-180 N/cm of roller length. Optionally, sintering roller 519 rolls over layer 151 as tray 200 advances with stage 250. According to some embodiments of the present invention, the mask applied on layer 151 with ink 32 acts as a temporary insulator so that only a selected portion of layer 151 that does not include ink 32 is sintered as sintering roller 519 rolls over layer 151. Typically, the powder in the masked portions, e.g. portions 327 (FIG. 6) remains intact with optionally, the absorbed oil 324 evaporating as a result of sintering.

According to some embodiments of the present invention, a diameter of sintering roller 519 is defined so that a circumference of sintering roller 519 is larger than a length of tray 200 and/or a length over which sintering roller 519 is required to roll on a layer 151. In some exemplary embodiments, roller is heated using an array of electric heaters 521, e.g. finger type electric heaters. Typically, sintering roller 519 provides uniform heating surface of between 600°-800° C. Typically sintering roller 519 rolls over layer 151 in much less than one rotation, so that potential local cooling of sintering roller 519 due to contact with layer 151 does not adversely affect the sintering process. In addition, any debris accumulated on sintering roller 519 is not reintroduced on layer 151. In addition, the electrical cables that support the heating fingers are not typically twisted. In some exemplary embodiments, sintering roller 519 is pressed down on layer 151 with a piston or pistons 520 that presses down on an arm 518 connected to an axle of roller 519.

Optionally, plurality of passages 205 provide for maintaining table 200 and layers close to table 200 at a desired temperature, e.g. up to about 10° C. above ambient temperature during sintering. During the sintering process, heat that typically spreads from the top surface (held at a high temp) toward table 200 (held at relatively low temp) and the fluid typically absorbs the heat. Typically, fluid flow through passages 205 is circulatory and passes a heat exchange unit that cools the fluid before reentering passages 205. According to some embodiments of the present invention, roller 519 is cleaned after sintering, e.g. after each layer is sintered. In some exemplary embodiments, a brush 514 brushes against roller 519. Optionally, brush 514 is partially covered by a collection hood 515 and powder is removed by brush 514 is removed with a suction port 516. Optionally, rotation of roller 519 during cleaning is initiated by a piston 25 that moves an arm 24 that contacts roller 519.

In some exemplary embodiments, for a post compaction layer thickness of 50 μm and post compaction mask thickness of 100 μm, the required time for full sintering may be around 0.2 msec. In such an exemplary case, a linear speed for roller 519 may be 1 m/sec and the roller rotation speed may be 20 rad/sec.

According to some embodiments of the present invention, layer 151 and/or object 15 is immediately cooled in cooling station 60 after sintering. Optionally, cooling station 60 is positioned substantially close to the sintering station so that cooling may be applied immediately after sintering. According to some embodiments of the present invention, a pattern of nitrogen air knifes 65 are used to provide a jet stream of gas for cooling layer 151 and/or object 15.

Figure 11:
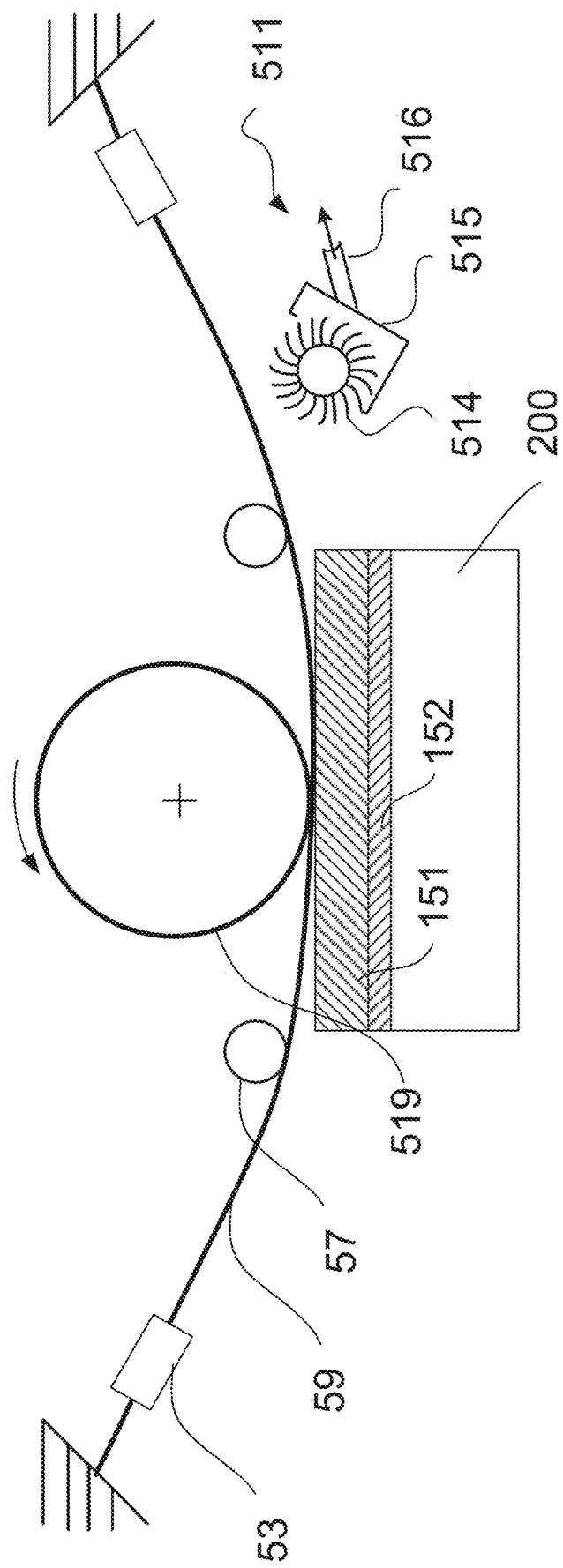
FIG. 11 is a simplified schematic drawing of another exemplary sintering station in accordance with some embodiments of the present invention.

Reference is now made to FIG. 11 is a simplified schematic drawing of another exemplary sintering station in accordance with some embodiments of the present invention. According to some embodiments of the present invention, a foil 59 provides an interface between roller 519 and layer 151. In some exemplary embodiments, secondary rollers 57 stretch foil 59 over a length while sintering roller 519 pushes down on layer 151 and rolls along layer 151. Typically, the touching point between foil 59 and the post compaction layer varies while the roller 519 advances. Typically, sintering roller 519 and secondary rollers 57 rotate together over foil 59. Optionally, the low lift of the foil due to secondary rollers 57, provides a smooth separation between layer 151 that may prevent peeling and/or sticking of particles from layer 151 on foil 59. Optionally, foil 59 is supported by a frame with spring mountings 53 allowing foil 59 to be held with tension.

According to some embodiments of the present invention, sintering station includes a cleaning unit 511 that operates in a manner that is similar to cleaning unit 411 described herein above. Typically, cleaning unit includes a brush 514 that is partially covered by a collection hood 515. Typically, debris collected by brush 414 is removed with suction via a suction port 416.

Typically, the mask generates a delay in the sintering process but does not prevent sintering under all circumstances. There is potential for spontaneous sintering in the masked areas of a current layer and/or pervious layers. Masked areas provide support for subsequent layers and the masked area in a lower layer may be subject to spontaneous sintering when covered by an unmasked area. According to some embodiments of the present invention, applying an insulation coating, e.g. frit above a threshold thickness can help prevent spontaneous sintering. The present inventor has also found that maintaining a powder layer below a threshold thickness can also help prevent spontaneous sintering below the mask coating. In some exemplary embodiments, both the thickness of the frit layer and the thickness of the powder layer are controlled to avoid spontaneous sintering.

Figure 12:
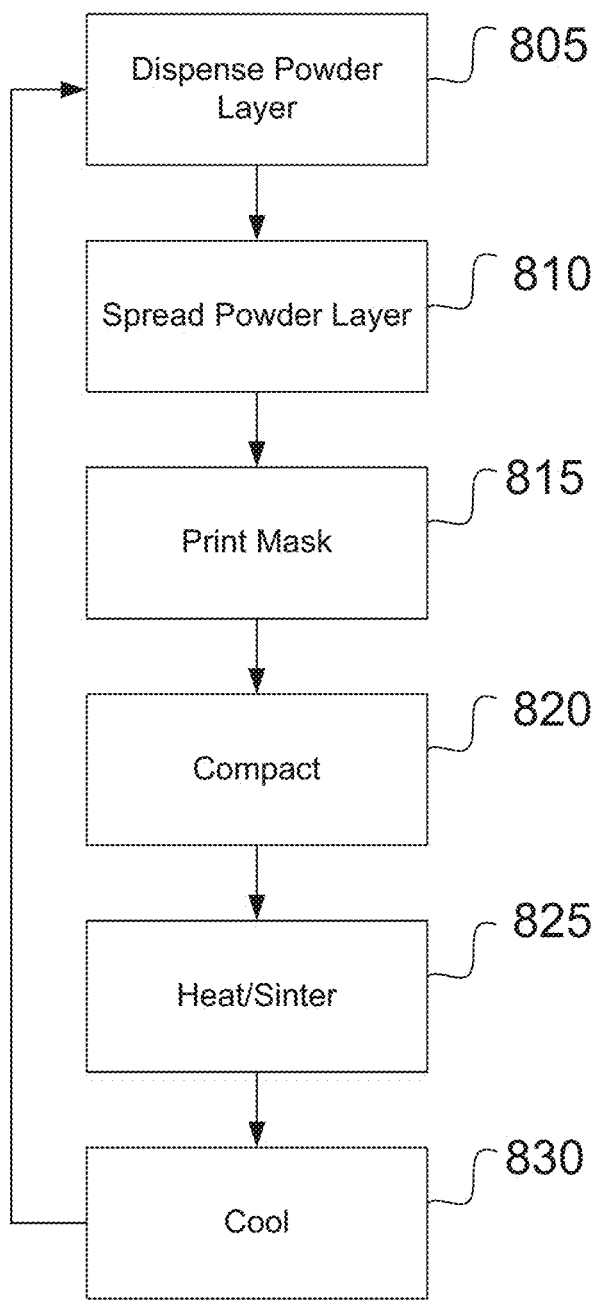
FIG. 12 is a simplified flow chart of an exemplary method for constructing an object by 3D printing in accordance with some embodiments of the present invention.

Reference is now made to FIG. 12 is a simplified flow chart of an exemplary method for constructing an object by 3D printing in accordance with some embodiments of the present invention. According to some embodiments of the present invention, the method includes dispensing powder layer on a building tray (block 805) and spreading the powder layer to obtain and uniform layer of powder (block 810). According to some embodiments of the present invention, a mask that defines a boundary of the object is printed over the powder layer (block 815). According to some embodiments of the present invention, the ink used in the printing process is formed from material that provides for excluding the printed area from sintering during a subsequent sintering process. According to some embodiments of the present invention, prior to sintering, the printed layer is compacted (block 820) to prepare the layer for sintering. Typically, the compaction provides for remove air from the printed layer to improve heat conduction during sintering. Optionally, the compaction also provides for breaking an oxide crust that typically forms on particles of the metal powder, e.g. aluminum powder. Typically, heat conduction through the layer of powdered metal is more uniform after breaking up the oxide crust. According to some embodiments of the present invention, sintering (block 825) is performed on a post compacted layer. Optionally, sintering is performed with a sintering roller. According to some embodiments of the present invention, the layer is immediately cooled after sintering (block 830). Typically, cooling prevents heat accumulated during sintering from spreading in masked areas of the layer. According to some embodiments of the present invention, the method described in blocks 805-830 is repeated for each layer printed. Typically, after all the layers have been printed, the final object can be removed from the powder bed. Typically, no additional post finishing procedures are required.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A system for building a three dimensional object comprising:
   a powder delivery station for applying a layer of powder material on a building tray;
   a digital printing station for printing a mask pattern on the layer, wherein the mask pattern defines a negative of a portion of the layer to be sintered;
   a thermal mass roller configured to sinter the portion of the layer that is defined by the mask pattern to be sintered as it is rolled on the layer and to apply pressure to the layer to promote adhesion between the layer and a previous layer, wherein the thermal mass roller is stationed in a sintering station and wherein the sintering station includes an anti-peeling mechanism, the anti-peeling mechanism including a foil positioned between the thermal mass roller and the layer; and
   a stage for repeatedly advancing the building tray to each of the powder delivery station, digital printing station and sintering station to build a plurality of layers that together form the three dimensional object.

2. The system according to claim 1, comprising a die compacting station for compacting the layer of powder material, wherein the compacting station includes a die for receiving the layer.

3. The system according to claim 2, wherein the die compacting station includes a heating element for warming a surface of the die that interfaces with the layer.

4. The system according to claim 2, wherein the die compacting station is operable to apply up to 100 MPa of pressure on the layer and wherein the die compacting station includes a lifting system for lifting the building tray toward the die.

5. The system according to claim 2, wherein the die compacting station includes an anti-peeling mechanism, the anti-peeling mechanism including a foil positioned between the building tray and the die, wherein the foil is supported by two opposite edges to allow bowing of the foil during separation between the building tray and the die.

6. The system according to claim 1, comprising a cooling station for cooling the layer after sintering, wherein the cooling station includes air knives for providing jet stream of gas.

7. The system according to claim 1, wherein the digital printing station is operable to dispense ink including a frit suspended in a liquid carrier, wherein the frit is formed from particles having a diameter of between 500 nm to 1 µm.

8. The system according to claim 1, wherein the thermal mass roller is configured to be heated to 0°-80° C. above the melting temperature of the powder.

9. The system according to claim 1, wherein the thermal mass roller is configured to apply a pressure in the order of magnitude of 20-180 N/cm of roller length.

10. The system according to claim 1, wherein the sintering station includes an array of vertical-cavity surface-emitting lasers (VCSEL) that swept over the layer for pre-heating.

11. The system according to claim 1, wherein the building tray includes at least one channel running substantially parallel to a surface of the tray on which the layer is positioned, through which fluid is introduced for cooling the building tray.

12. The system according to claim 1, wherein the powder is aluminum or aluminum alloy powder.

13. The system of claim 1, comprising a powder spreading station, wherein the powder spreading station includes a spreading roller configured to spread a layer of powder dispensed in the powder delivery station and wherein the spreading roller is other than the thermal mass roller.

14. A system for building a three dimensional object comprising:
   a powder delivery station for applying a layer of powder material on a building tray;
   a digital printing station for printing a mask pattern on the layer, wherein the mask pattern defines a negative of a portion of the layer to be sintered;
   a die compacting station for compacting the layer of powder material, wherein the compacting station includes a die for receiving the layer, wherein the die compacting station includes an anti-peeling mechanism, the anti-peeling mechanism including a foil positioned between the building tray and the die, wherein the foil is supported by two opposite edges to allow bowing of the foil during separation between the building tray and the die; and
   a thermal mass roller configured to sinter the portion of the layer that is defined by the mask pattern to be sintered as it is rolled on the layer and to apply pressure to the layer to promote adhesion between the layer and a previous layer, wherein the thermal mass roller is stationed in a sintering station; and
   a stage for repeatedly advancing the building tray to each of the powder delivery station, digital printing station and sintering station to build a plurality of layers that together form the three dimensional object.

15. The system according to claim 14, wherein the die compacting station includes a heating element for warming a surface of the die that interfaces with the layer.

16. The system according to claim 14, wherein the die compacting station is operable to apply up to 100 MPa of pressure on the layer and wherein the die compacting station includes a lifting system for lifting the building tray toward the die.

17. The system according to claim 14, comprising a cooling station for cooling the layer after sintering, wherein the cooling station includes air knives for providing jet stream of gas.

18. The system according to claim 14, wherein the powder is aluminum or aluminum alloy powder.

* * * * *